2 Sheets--Sheet 1.

JOHN CHRISTY.
Improvement in Pruning-Shears.

No. 115,571.

Patented June 6, 1871.

Witnesses.
N. T. Campbell.
J. N. Campbell.

Inventor
John Christy
by
Mason, Fenwick & Lawrence

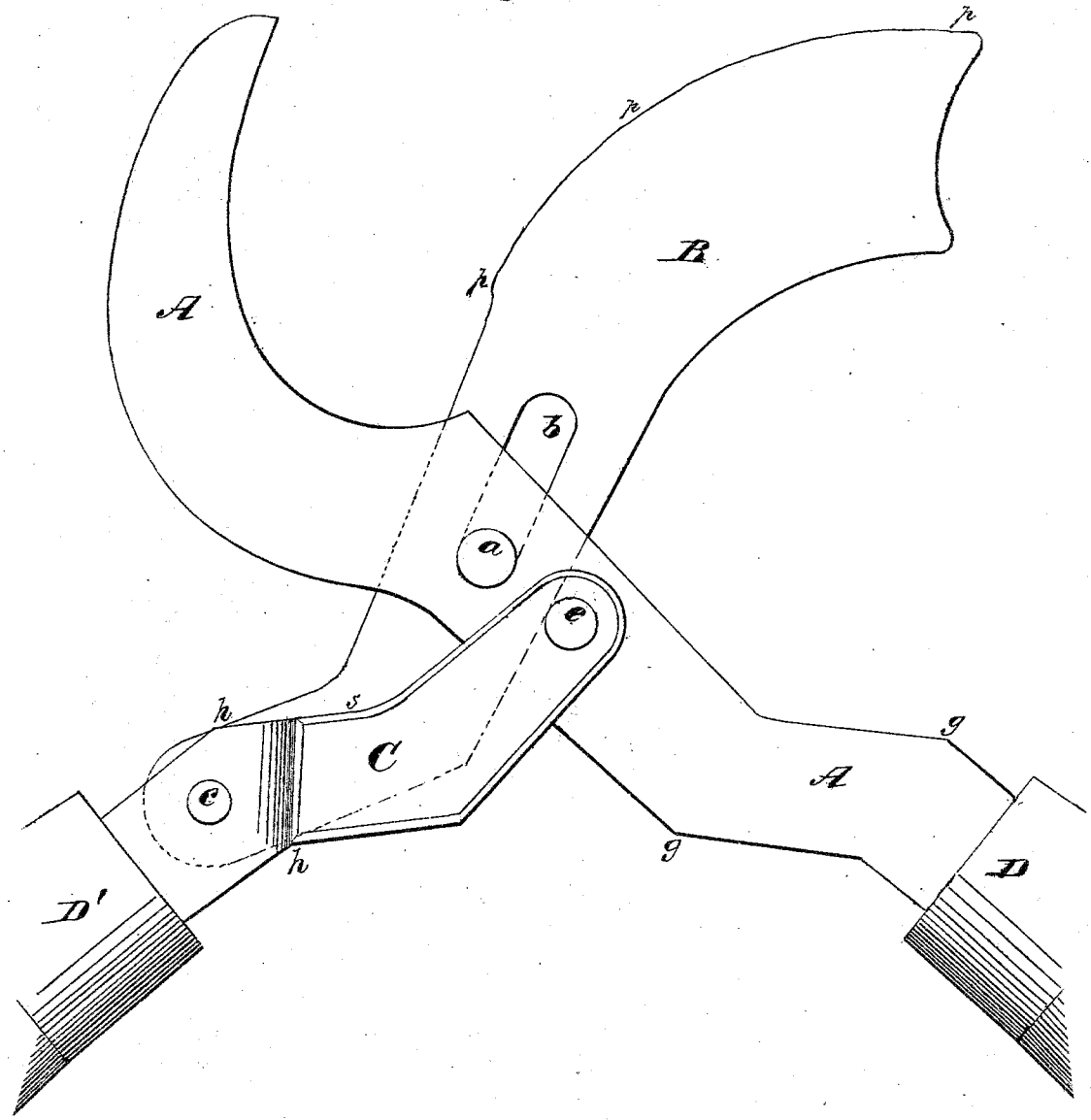

115,571

UNITED STATES PATENT OFFICE.

JOHN CHRISTY, OF CLYDE, OHIO.

IMPROVEMENT IN PRUNING-SHEARS.

Specification forming part of Letters Patent No. 115,571, dated June 6, 1871.

*To all whom it may concern:*

Be it known that I, JOHN CHRISTY, of Clyde, in the county of Sandusky and State of Ohio, have invented a new and useful Improvement in Pruning-Shears; and I do hereby declare that the following is a full, clear, and exact description thereof, reference being had to the accompanying drawing making part of this specification, in which—

Figure 1:
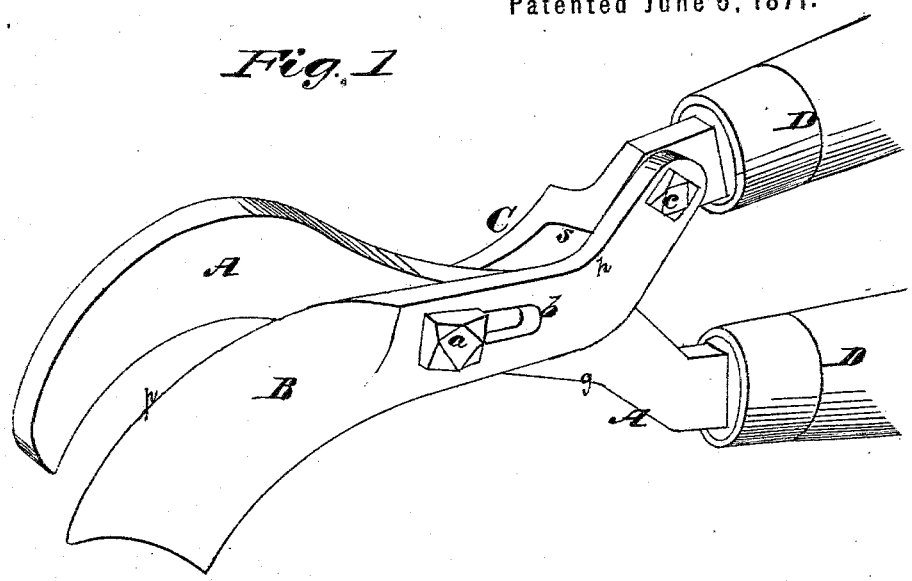
Figure 2:
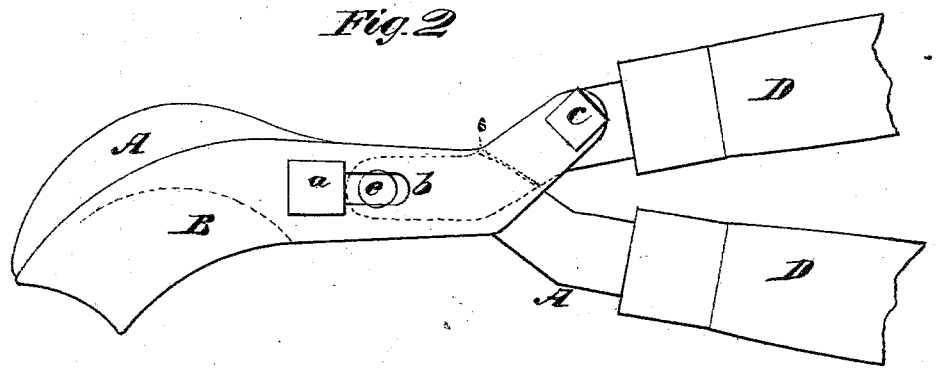
Figure 3:
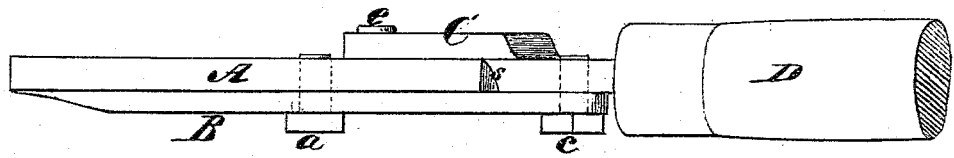

Figure 1, Plate 1, is a perspective view of the shears with portions of the handles broken off. Fig. 2 is a view of one side of the shears. Fig. 3 is an edge view. Fig. 4, Plate 2, is an enlarged view with the blades open.

Similar letters of reference indicate corresponding parts in the several figures.

The object of this invention is to improve pruning-shears which have convex cutting-edge blades, working with a drawing cut, in combination with a concave blade or hook. The nature of my invention consists in a blade made without any bend in its flat sides, and with a convex cutting-edge, and an angular attaching end; a hook made without a bend in its flat sides, and with a concave cutting-edge and an angular shank; and an angular-shouldered shank of a form very closely resembling the letter S; all constructed, combined, and arranged in such manner that the well-known draw-cut is secured; and, at the same time, the handles are brought into the same plane with one another, and yet the blade has no bend in its flat sides. The handles are also firmly stopped from closing together beyond a certain point; the blade and hook saved from strain, and supported and kept from twisting, and the great difficulty experienced in grinding those blades which have a bend in their flat sides, upon a platform arranged beneath a grindstone, is wholly overcome; and, withal, an improved form of hook and blade, by reason of the matching angles at their rear extensions, is secured.

To enable others skilled in the art to unstand my invention, I will explain its construction and operation.

In the accompanying drawing, D D' represent the two handles of the instrument, which are in the same plane. Into the handle D is inserted the shank of a hooked blade, A; and into the handle D' is inserted the tang of a shouldered shank, C. The shank of the blade A and the shouldered shank C present angles at $g\ h$, which bring the handles D D' nearer together. The end of the shouldered shank C is connected to the shank of the hooked blade by means of a pivot, $e$, which is the fulcrum about which the handles articulate. At $s$ the shank C is bent so as to present a shoulder. By thus bending this shank C that portion of it which is inserted into the handle D' is in the same plane with the hooked blade A, while the other portion of this shank lies on one side of the said blade, as clearly shown in Fig. 3. B represents the shear-blade or cutter, which presents to the hooking-edge of blade A a convex cutting-edge, $p$. The shank of this blade has an oblong slot, $b$, made through it in a direction with its length, through which a removable pivot-bolt, $a$, passes, that is inserted into the shank of the hooked blade B. The end of the shank of blade B is connected to that portion of the shouldered shank C which is in the same plane as the hooked blade A by means of a removable pivot-bolt $c$. It will thus be seen that the blade B is connected to the shank C, and also to the blade A, by means of pivots, which are independent of the fulcrum-pivot $e$, and which will allow the said blade B to be detached at pleasure without removing the pivot $e$. The cutting-blade B is flat, and its cutting-edge is produced by beveling this blade on one side; consequently, it can be conveniently presented to a stone when it is necessary to sharpen it. It will also be seen that the arrangement of the blade B on one side of the blade A, in combination with the bent shank C, part of which is arranged on the opposite side of the blade A, affords a brace for the handles, and prevents the pivots from being subjected to twisting strain during the act of cutting. It will also be seen that the shoulder $s$ of the shank C affords a stop for preventing the handles D D' from shutting together on the hands of the operator. This feature is shown in Fig. 2, wherein it will be seen that when the cutting-edge $p$ closes completely on the hook of blade A, the shoulder $s$ will abut against the back edge of the angular portion $g$ of the shank of hooked blade A. By reference to Figs. 2 and 4 it will be seen that the blade B has a longitudinal sliding movement, and, at the same time a vibrating movement, which movements produce the well-known drawing or shear-cut.

I do not claim the construction of pruning-shears shown in the rejected application of A. B. Crandall, filed April 11, 1868; but

What I claim as my invention, and desire to secure by Letters Patent, is—

The improved pruning-shears herein described, as a new article of manufacture, said shears combining the shouldered angular shank C, the concave hook A, with angular shank, and the convex slotted blade B, with angular rear attaching-end, all constructed and arranged as described.

JOHN CHRISTY.

Witnesses:
  AARON L. HATFIELD,
  Mrs. S. HATFIELD.